E. P. LEONARD & P. H. JACKSON.
LIGHT FOR VAULTS, &c.
No. 20,721. Patented June 29, 1858.
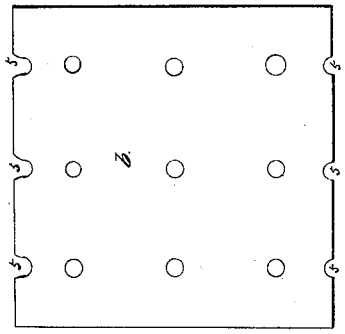
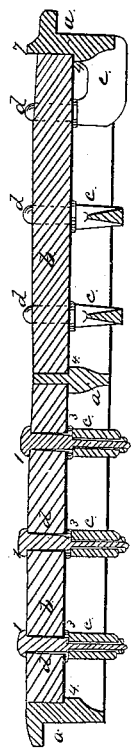
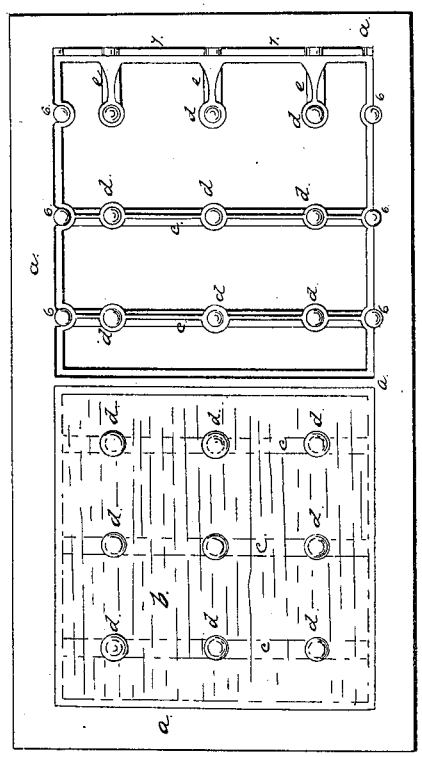

UNITED STATES PATENT OFFICE.

E. P. LEONARD AND P. H. JACKSON, OF NEW YORK, N. Y.

ILLUMINATING-COVER FOR VAULTS, &c.

Specification of Letters Patent No. 20,721, dated June 29, 1858.

*To all whom it may concern:*

Be it known that we, ELIJAH P. LEONARD and PETER H. JACKSON, of the city, county, and State of New York, have invented, made, and applied to use certain new and useful Improvements in Lights for Vaults, Decks of Vessels, in Sidewalks, Pavements, Roofs, Floors, &c.; and we do hereby declare that the following is a full, clear, and exact description of the construction thereof and the nature of our invention, reference being had to the annexed drawing, making part of this specification, wherein—

Figure 1, is a plan and Fig. 2, a vertical section of our said invention, as applied to a frame for receiving two flat glasses, one of which is detached and shown separately in Fig. 3.

Similar marks of reference denote the same parts.

Deck lights for vessels, and lights in floors have heretofore been made of glasses of various sizes, shapes, and thicknesses, and the same have been used either separately or two or more together; and have been contained in metal, or wood frames; and in the patent of Edward Rockwell, March 8th, 1834, a glass is shown as contained in a metallic rim or vault cover. But the pieces of glass used were of large size, and for the purpose of giving strength, as they were supported at the edges or circumference only, were necessarily made of great thickness, and thereby the light was very much obscured; subsequently vault lights were made by a metallic plate perforated and thus receiving many small glasses, or lenses of glass, supported by their edges only, upon said metallic plates, which said metallic plates were cast with knobs as part thereof, and rising above them. The effect of this mode of construction was that numerous joints were made that could not conveniently be kept tight, and also that but little light comparatively was admitted; our object has been to dispense with metallic plates, and to discover a mode of using larger and thinner surfaces of glass, and supporting the same beneath in such a manner that they would be safe, and sufficiently secure to bear the weight of travel and support, when necessary, heavy burdens, while at the same time a larger space and more free passage for light would be given, and the whole made tight and water proof.

Our invention does not consist in the use of any particular size, shape or thickness of glass or in multiplying the number of lights so as to have several lights in one frame, but it consists in the manner of using plates of glass, for pavements, vault lights, deck lights, floors, &c. and the manner of supporting and sustaining the same from beneath. We prefer the use of perforated plates of glass, and have described the mode of using this more particularly in our specification.

In the drawing we have shown a light to be applied in a deck, floor, platform, steps, vault cover, or other desired position, and either separately, or where several are contiguous to each other, or more or less remote, and contained in a wooden or metal sash, or frame work and the glass itself we prefer to be about eight inches square, but the same may be any other size or shape adapted to the peculiar circumstances.

$a$ is the framework around the glass $b$ in which glass holes are formed at suitable distances apart and passing through said glass.

$c, c$ are cross bars beneath the glass $b$, passing from one part of the frame $a$, to the other, and said cross-bars occupy such a position in relation to the holes in the glass, as to be immediately below said holes, and at a more or less distance below the glass, or said glass may rest upon the upper surface of said bars $c$, their entire length or only at intervals.

$d, d$, are thimbles or pins from said cross-bars $c, c$, passing through the aforesaid holes in the glass, and rising sufficiently above the surface of the same to give a foothold to persons walking over the same and prevent slipping or falling on the smooth surface of the glass. These thimbles or pins are to be formed of the desired size and shape, and may be either formed on the bars $c, c$, or rest thereon, although we prefer to use such thimbles of pins as are shown in the drawing, with a head 1 above the glass, and a screw 2, passing through the bar $c$, with a nut 3, below as by this construction, the glass is bolted into place in the frame, to secure the same to the cross-bars, or said thimbles or pins might be formed on the cross bars $c$, and the glass slipped over them, at the same time suitable cement is to be inserted within the holes in the glass, and also beneath the head 1, to make the parts water-tight, and small washers, or strips of rubber or other material, may be used between the bars c and the under side of the glass either the whole length of the bar or only at intervals.

The frame a, into which the glass b, is introduced, should be provided with a flange 4 for receiving the edges of the glass and suitable cement or packing should be introduced at this point to fill the joint between the frame and glass.

In some instances we form grooves 5 round the edges of the glasses b, and provide corresponding projections 6, 6, around the frame receiving the glass, which projections 6, 6, rising above the surface of the glasses, prevent the edges from being chipped or broken by any blow at this point, or a rib may be formed on the same around the edges of the glasses as at 7, with notches therein for passing away water.

The surface of the frame work a, may be of any desired character, either rough or smooth, in the form so well known for vault covers, metallic stairs &c. and where a liability exists for slipping the rough surface, to the frame a is preferable, and it acts in conjunction with the thimbles or pins d, d, as the same effectually prevent any person slipping on the glass, under any circumstances.

The cross-bars c, may be formed of any desired sectional shape, but we prefer that they be made narrow at the upper edge, or leveled off, to prevent obstructing the light as shown in the section Fig. 2.

A slight variation in the manner of supporting the thimbles near the edges of the glass is shown at e, where projecting arms are formed on the frame a, to sustain the glass and pins d.

It will be readily perceived, that this mode of using plates of glass, supported from beneath, at other points than at their edges, or circumference, may be varied, and the same principle applied in various forms. It will also be perceived that it is not absolutely essential that the glass should in all cases, or for all uses be perforated, and arranged with pins or thimbles. But our invention consists in using plates of glass of any desired size, shape, and thickness, and supporting them from below at other points than the edges or circumference, so that the glass forms a part of floor pavement, or deck, as the case may be, without the use of metallic plates. We prefer in all cases, the use of perforated plates of glass, provided with pins or thimbles, as above described.

We do not claim the supporting the plates of glass, at their edges, or circumference, as that is old, nor do we claim the use of glass generally for the within named purpose; but

What we claim as our invention and desire to secure by Letters Patent is—

1. The use of a plate or plates of glass, in vault covers, platforms, pavements, sidewalks, decks, or for similar purposes, which plate or plates are supported from below, substantially in the manner above specified.

2. We claim thimbles, pins, or their equivalents, passing through perforations in a plate of glass, or plates of glass, and formed with, connected to, or resting on a suitable support beneath the plates of glass, substantially in the manner, and for the purposes specified.

3. We claim grooving or notching the edges of the plate of glass, for the purpose of receiving projections, occupying said grooves or notches, and thus protecting the edges of the plate of glass from injury as specified.

4. We claim the use of perforated plates of glass, for pavements, sidewalks, decks, platforms, vault covers &c. prepared substantially in the manner and for the purposes above described.

In witness whereof, we have hereunto set our signatures, this fourth day of June 1858.

ELIJAH P. LEONARD.
PETER H. JACKSON.

Witnesses:
LEMUEL W. SERRELL,
THOMAS G. HAROLD.